(12) United States Patent
Torre

(10) Patent No.: US 6,901,815 B2
(45) Date of Patent: Jun. 7, 2005

(54) ENGINE TORQUE SENSOR

(75) Inventor: Anthony J. Torre, West Bloomfield, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 420 days.

(21) Appl. No.: 09/793,058

(22) Filed: Feb. 26, 2001

(65) Prior Publication Data

US 2002/0002877 A1 Jan. 10, 2002

Related U.S. Application Data

(60) Provisional application No. 60/186,582, filed on Mar. 2, 2000.

(51) Int. Cl.[7] ................................................. G01L 3/02
(52) U.S. Cl. ................... 73/862.29; 73/116; 123/90.15; 123/90.17
(58) Field of Search ............................. 73/862.29, 116, 73/862.624, 862.324; 123/90.15, 90.17

(56) References Cited

U.S. PATENT DOCUMENTS

| | | | | |
|---|---|---|---|---|
| 3,309,920 A | * | 3/1967 | Cuthbert ................ | 73/862.324 |
| 3,871,215 A | | 3/1975 | Pratt | |
| 4,347,748 A | * | 9/1982 | Pierson .................... | 73/862.28 |
| 5,001,937 A | * | 3/1991 | Bechtel et al. .......... | 250/231.14 |
| 5,038,616 A | * | 8/1991 | Schneider et al. ............ | 702/43 |
| 5,253,531 A | * | 10/1993 | Walker et al. ........... | 250/237 G |
| 5,265,480 A | * | 11/1993 | Tsuji et al. .................. | 324/209 |
| 5,438,882 A | * | 8/1995 | Karim-Panahi et al. ....... | 73/650 |
| 5,449,900 A | | 9/1995 | Halliwell | |
| 5,992,382 A | | 11/1999 | Bruedigam et al. | |
| 6,478,000 B2 | * | 11/2002 | Ishii et al. ............... | 123/90.17 |
| 6,499,449 B2 | * | 12/2002 | Michelini et al. ......... | 123/90.15 |
| 6,640,758 B2 | * | 11/2003 | Ashida .................... | 123/90.15 |
| 6,665,605 B2 | * | 12/2003 | Boyer et al. ................. | 701/103 |

FOREIGN PATENT DOCUMENTS

| | | |
|---|---|---|
| EP | 0750184 | 12/1996 |
| JP | 56110030 | 9/1981 |

* cited by examiner

*Primary Examiner*—Edward Lefkowitz
*Assistant Examiner*—Jermaine Jenkins

(57) ABSTRACT

An optical sensing system is used to measure engine torque. A pair of patterns are formed on a driveshaft between a transmission and axle differential. The patterns are spaced apart from one another by a predetermined distance and are formed about the circumference of the driveshaft. Lasers and photo receivers are used to scan the patterns as the driveshaft rotates. Data from the photo receives is used to determine the angle of twist on the driveshaft which is proportional to the engine torque. The torque for each cylinder can be measured by generating a torque profile for every two revolutions of the driveshaft. The torque profile is read in 120 degree increments for a six cylinder engine and in 90 degree increments for an eight cylinder engine, for example.

22 Claims, 2 Drawing Sheets

ENGINE TORQUE SENSOR

RELATED APPLICATION

This application claims priority to provisional application 60/186,582 filed on Mar. 2, 2000.

BACKGROUND OF THE INVENTION

1. Field of the Invention

This invention relates to a method and apparatus for measuring the output torque of automotive engine. Specifically, a sensing system includes components mounted to a driveshaft that are used to measure the twist of the driveshaft under load to determine engine torque.

2. Related Art

Engine torque is a critical parameter that allows a vehicle to accelerate. For heavy duty vehicles, there are acceleration and overall torque output requirements that need to be met in order to satisfactorily perform designated duty cycles. As more auxiliary loads are run off of vehicle engines, torque losses frequently occur causing poor engine performance. These auxiliary loads such as air conditioning, alternators, generators, power steering, or power take-offs consume a portion of the engine torque that would normally satisfy the acceleration and output torque requirements. Thus, it is very important to be able to accurately measure engine torque.

There are different types of engines such as gas and diesel engines, for example. Engines typically have a number of cylinders that are driven by a common crankshaft. In a gas powered internal combustion engine, the cylinders each have a piston, a spark plug, and a connecting rod that interconnects the piston and the crankshaft. A fuel system supplies fuel to each of the cylinders, which is ignited by the spark plug to generate power or output torque. Typically a processor or other similar apparatus is used to control the fuel supply to the engine. If the torque for each cylinder could be measured, a closed torque control system could be utilized to provide independence from auxiliary loads. A closed system that separately identifies each cylinder torque can ease tolerances on fuel injection components because adjustments are easily made in the fuel control system.

Several different methods have been used to measure engine torque, however, there is no simple method for determining an individual torque for each engine cylinder. One method for measuring engine torque has a sensor mounted on the engine to generate a signal with different amplitudes for each engine cylinder. This results in a complex signal that is difficult to translate. Another method determined torque by using engine speed changes. Another method has a sensor mounted in the engine that utilizes Hooke's law to determine an engine output torque but the output is not used to determine torque for each cylinder.

It is the object of the present invention to provide a simple and effective apparatus and method for calculating engine torque on a cylinder by cylinder basis that overcomes the deficiencies outlined above. Further, this method will allow the fuel system to be easily adjusted to compensate for auxiliary loads.

SUMMARY OF THE INVENTION

In a disclosed embodiment of this invention, a system for measuring engine torque includes an engine having an engine output shaft operatively connected to a driveshaft to provide driving input to an axle differential. A portion of a sensor assembly is mounted to the driveshaft to measure the twist of the driveshaft. Preferably a portion of the sensor assembly is mounted on the driveshaft between a transmission and the axle differential. A processor determines engine torque based on driveshaft twist measure and can control predetermined engine parameters based on the torque signal.

In a preferred embodiment, the sensor assembly includes a position target supported on the driveshaft. The position target is comprised of a first specified pattern and a second specified pattern spaced apart from the first specified pattern by a predetermined distance. The first and second specified patterns have reflective and non-reflective surfaces placed on the driveshaft. Preferably, the first and second specified patterns are comprised of a plurality of spaced apart lines having variable thicknesses compared to each other. The lines are placed about the circumference of the driveshaft parallel to a longitudinal axis. A first laser is aimed at the first specified pattern and a second laser is aimed at the second specified pattern. A first photo receiver is mounted adjacent to the first laser to receive a first reflected beam from the first specified pattern and a second photo receiver is mounted adjacent to the second laser to receive a second reflected beam from the second specified pattern. The processor compares data from the first photo receiver to data from the second photo receiver to determine driveshaft twist, which is proportional to the engine torque.

In one embodiment, the engine includes a plurality of cylinders actuated by rotation of a crankshaft. A torque profile is generated as the driveshaft rotates. Peaks in the profile are monitored so that an individual torque value can be assigned to each of the cylinders.

A method for measuring engine torque includes the following steps. A portion of a sensor assembly is mounted on the driveshaft, the twist of the driveshaft is measured, and engine torque is determined based on the twist measurement. Preferably, the twist is optically measured with at least one laser and photo receiver. Additional steps include forming a first specified pattern on the driveshaft, forming a second specified pattern on the driveshaft at a predetermined distance from the first specified pattern, scanning the first specified pattern with a first laser, receiving a first reflected beam from the first laser with a first photo sensor, scanning the second specified pattern with a second laser, and receiving a second reflected beam from the second laser with a second photo sensor.

The preferred method includes measuring the twist of the driveshaft multiple times during each revolution of the driveshaft to form a torque profile and reading the torque profile at 120 degree increments for two revolutions to individually assign torque values to each cylinder in a six cylinder engine. Optionally, the torque profile is read at 90 degree increments for two revolutions to individually assign torque values to each cylinder in an eight cylinder engine.

The subject apparatus provides a simple method for determining engine torque for each cylinder. As a result, adjustments can easily be made to the fuel control system for the engine to provide the desired torque level while accommodating auxiliary loads.

These and other features of the present invention can be best understood from the following specification and drawings, the following of which is a brief description.

DETAILED DESCRIPTION OF AN EXEMPLARY EMBODIMENT

Figure 1:
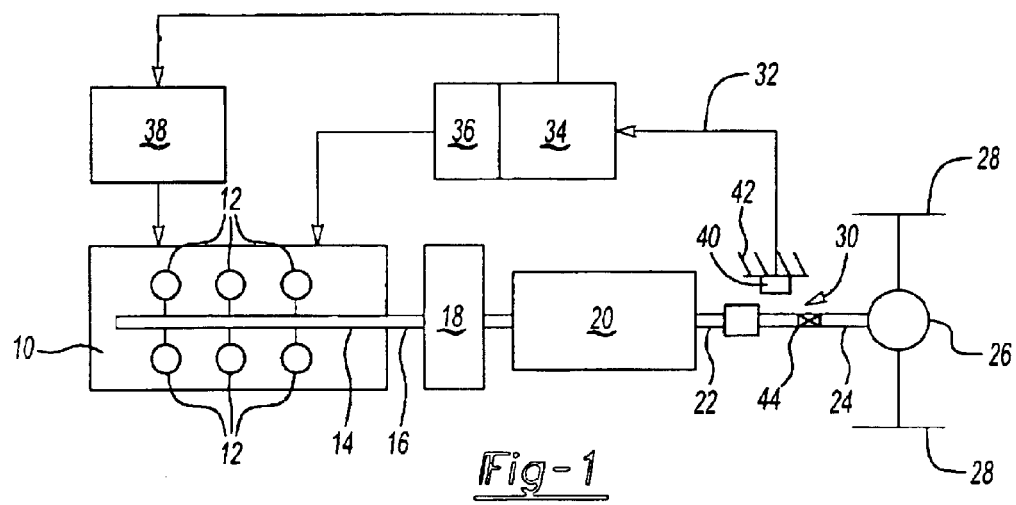
FIG. 1 is a schematic view of a vehicle driveline incorporating the subject invention.

Referring to the drawings, FIG. 1 shows a schematic overview of a vehicle driveline. The driveline includes an engine 10 having a plurality of cylinders 12 that are operably connected to a crank shaft 14. Preferably, the engine 10 is a six (6) or eight (8) cylinder engine, however, engines having more or less cylinders could also utilize this unique method and apparatus. The engine 10 can be a diesel or gas engine, the operation of both of which are well known in the art and will not be discussed in detail.

Typically, the engine has an output shaft 16 that is coupled to a flywheel 18 mounted between the engine 10 and a transmission 20. The transmission 20 can be a manual or automatic transmission and includes a transmission output shaft 22 that is coupled to a driveshaft 24 to provide driving input torque to an axle differential 26. The differential 26 is used to drive vehicle wheels 28.

A sensor assembly, shown generally at 30, includes components that are mounted on the driveshaft 24 between the transmission 20 and the differential 26. The sensor 30 generates a signal 32 that is transmitted to a computer or microprocessor 34 to determine cylinder 12 by cylinder 12 torque. A timing mechanism 36, separate from or incorporated into the microprocessor 34, can be used to facilitate the determination of the individual cylinder torques. The cylinder torque information is used to adjust the performance of a fuel control system 38 that supplies fuel to the engine 10.

For short lengths, position accuracy has to be measured repeatabley within microseconds. Laser sensing of position allows this goal to be achieved. In the preferred embodiment, the sensor assembly 30 uses a laser system 40 to optically sense the angle of twist in the driveshaft 24. This twist angle, according to Hooke's law, is proportional to the amount of torque need to generate the twisting of the driveshaft 24 and is dependant upon the type of material used for the driveshaft 24. The laser system 40 can be mounted to one of the non-rotating driveline components or can be mounted to a vehicle structure, such as a frame or chassis member 42.

The sensor assembly 20 further includes a position target 44 supported on the driveshaft 24. The laser system 40 utilizes at least one laser 46 to generate a beam to scan the target 44. The beam is reflected back and received by at least one photo receiver 48 mounted adjacent to the laser 46.

Figure 2:
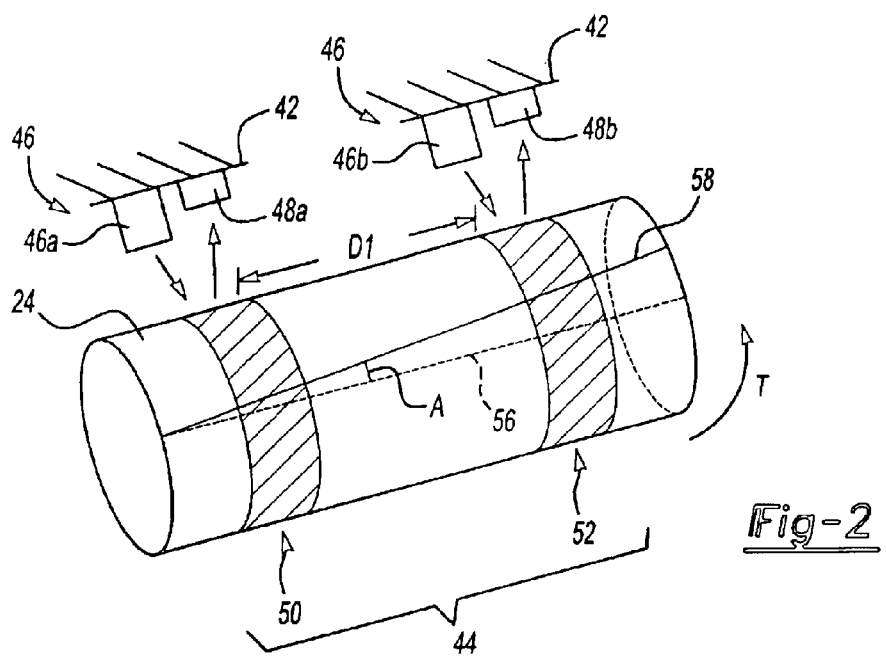
FIG. 2 is a magnified view of the driveshaft of FIG. 1 incorporating the subject invention

As shown more clearly in FIG. 2, the position target 44 is comprised of a first specified pattern 50 and a second specified pattern 52. Both patterns 50, 52 include reflective and non-reflective surfaces placed on the driveshaft 24. This can be implemented in any of various ways including black and white striped patterns using paint (evenly spaced bar codes), or black anodize and then machined polished surfaces. The first pattern 50 is placed at a first location and the second pattern 52 is spaced apart from the first pattern 50 by a predetermined distance D1.

In order to accurately measure the twist of the driveshaft 24, the laser system 40 includes a first laser 46a that generates a beam that scans the first pattern 50 and a second laser 46b that generates a beam that scans the second pattern 52. The first beam is reflected back and received by a first photo receiver 48a and the second beam is reflected back and received by a second photo receiver 48b. The signals from the photo receivers are sent to the microprocessor 34 and are compared to each other and used to determine the angle of twist for the driveshaft 24. With the appropriate known electronics, this signal can be measured in nanoseconds. The receiving photo sensors have to have sufficient response to insure this. Preferably, phototransistors with a response time of 10 nanoseconds or less are utilized. Additionally, the laser beam should be sufficiently narrow to work with the patterns 50, 52.

As can be seen in FIG. 2, when the driveshaft 24 is not under load, a normal non-stressed line 56 is shown extending along the length of the driveshaft 24. When a torque T is applied to the driveshaft 24, a stress line 58 is shown that deviates from the non-stressed line 56 by a twist angle A. This deviation is caused by the driveshaft 24 twisting under load. The patterns 50, 52, the lasers 46a, 46b, the photo receivers 48a, 48b, and the microprocessor 34 are used to determine this angle of twist A. This will be discussed in further detail below.

Once the angle of twist A is determined the engine output torque can also be derived from Hooke's law. Further, if the lasers 46 continuously scan the patterns 50, 52 a torque profile can be generated. This profile will include peak torques that correspond to a specific engine cylinder 12. As discussed above, the processor 34 can optionally utilize a timing mechanism 36 to determine which cylinders are firing at which peak torques in the profile to assign an individual torque value to each of the cylinders 12.

Any type of laser or photo receiver known in the art can be used to measure the angle of twist. Further, the operation of lasers and photo receivers are well known and will not be discussed in detail.

Figure 3:
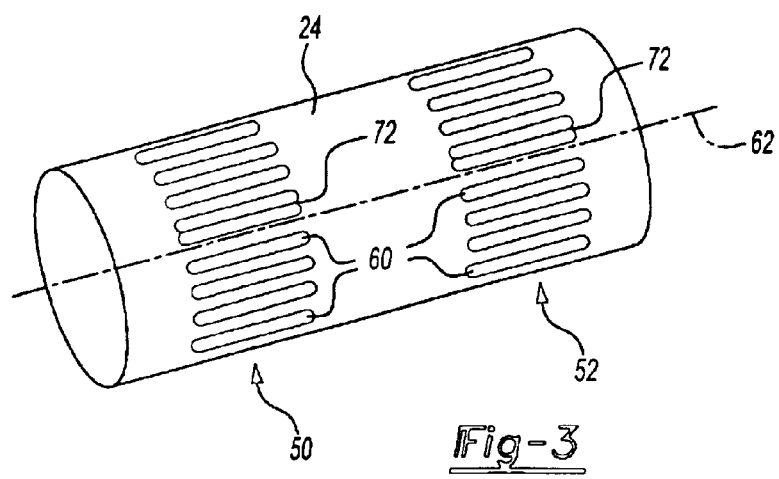
FIG. 3 is one embodiment of a specified pattern formed on the driveshaft.

Preferably, the first 50 and second 52 specified patterns are comprised of a plurality of spaced apart lines 60 having variable thicknesses compared to each other, see FIG. 3. The driveshaft 24 defines a longitudinal axis 62 and the lines 60 are placed about the circumference of the driveshaft 24 parallel to the longitudinal axis 62.

Figure 4A:
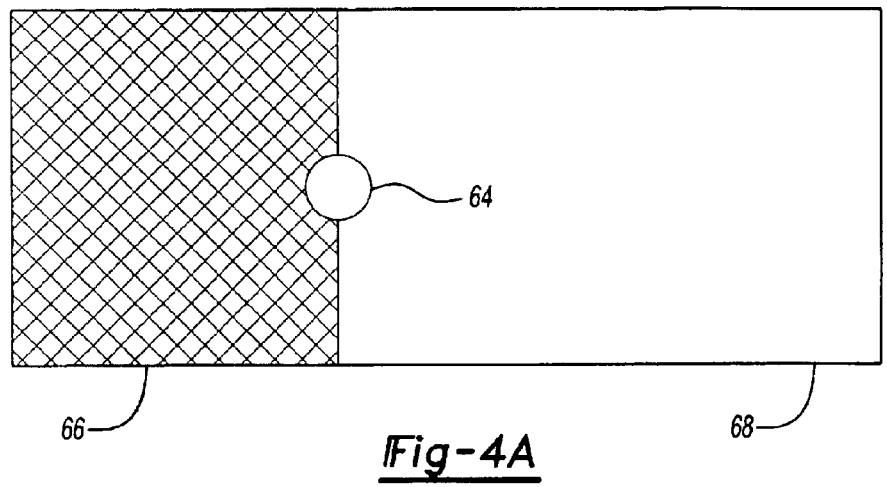
FIG. 4A is a schematic diagram of a laser light beam moving from a non-reflective surface to a reflective surface.
Figure 4B:
FIG. 4B is the signal generated from the laser scan of FIG. 4A.

The required hardware signal processing is shown in FIGS. 4A–D. FIG. 4A shows a laser beam 64 moving from a non-reflective surface 66 to a reflective surface 68. The light reflected back into the photo receiver 48 is a convolution of the light beam and the reflective surface. The resulting signal will be a slow starting ramp, shown in FIG. 4B, which will increase gradually until the center of the beam 64 passes the edge of the reflective surface 68. After this occurs, the output will approach a steady-state.

Figure 4C:
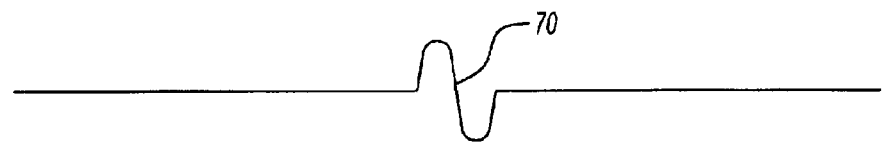
FIG. 4C is the derivative of the signal from FIG. 4B.
Figure 4D:
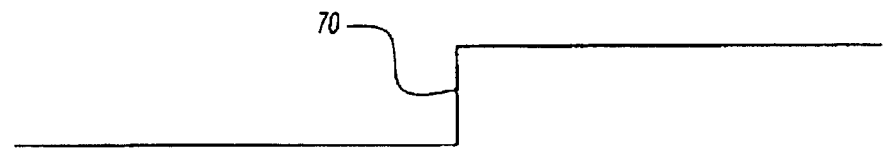
FIG. 4D is the measured edge from the zero cross over of FIG. 4C.

The actual threshold position can be measured by differentiating the incoming signal, shown in FIG. 4C, and identifying the zero crossovers 70 of signals (positive to negative thresholds), shown in FIG. 4D. This processing can be performed inexpensively with simple analog circuitry well known in the art.

Figure 5:
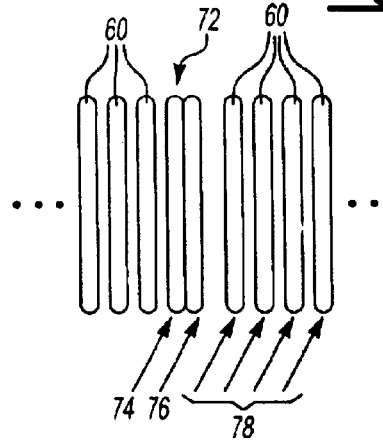
FIG. 5 is a magnified view of the pattern shown in FIG. 3.

In order to assign an individual torque to each engine cylinder 12, the torque should be measured more than once per revolution of the driveshaft 24. In order to accomplish this, an index must be placed in the position target 44. As shown in FIG. 5, each specified pattern 50, 52 includes an index line 72 that has a greater thickness than the other lines 60 in the patterns 50, 52. With the addition of an index 72, it is possible to break the position target 44 into two patterns 50, 52, discussed above. The indices 72 of the two patterns 50, 52 should be aligned along the driveshaft 24 and any offset can be removed by calibration.

The patterns 50, 52 are used to determine the individual cylinder torques. This may be performed when the transmission 20 is in direct drive (1:1 gear ratio) at the angles for individual cylinder firings. For a six-cylinder engine this angle is 120 degrees and for an eight-cylinder engine this angle is 90 degrees. At these angles the torque measured is relatively constant and the torque profile for each cylinder is shown every two (2) driveshaft 24 revolutions.

The cylinder torque is maximum at one point during its respective firing angle, after which the torque slowly decays. The cylinder torque is also affected by the compression effort on neighboring cylinders 12. The engine crankshaft 14 position and the position of the maximum cylinder torque must be determined in order to select a target line 60 closest to the peak torque position.

The bar pattern in FIG. 5 is one of many that can be used. In this pattern, the index 72 is a double bar, i.e. the index 72 is twice as thick as the other lines or bars 60. The index 72 includes a rising edge 74 and a falling edge 76. For all of the following bars 60 only a rising edge 78 is counted. The number of target bars 60 should be a multiple of twelve (12) to accommodate both six (6) and eight (8) cylinder 12 engines 10. If possible, one degree resolution is preferred.

The torque values will be derived from each bar set 50, 52. The twist angle A will be calculated as follows. First a delta time will be determined, i.e., a time difference for measurements from corresponding bars between the patterns (ΔTime=time_bar_N_1−time_bar_N_2). Then the measured angle A is calculated by dividing the delta time by the time different between similar measurements (angle= (ΔTime)/(last_time_bar_N_1−last_ time_bar_N_2). Next a corrected torque angle TA is calculated by utilizes a correction factor to remove the offset between the indices 72, (torque_angle=angle−offset_bar_N). Finally, the torque is determined by multiplying the torque angle by a constant (torque_N=torque_constant*torque_angle). The torque constant is dependent upon various driveshaft material properties such as shaft thickness, type of material, stiffness, and modulus of material, for example.

In order to calibrate and correct for the offset between corresponding bars in the first and second patterns 50, 52, the driveshaft 24 needs to be rotating and the transmission 20 must be in neutral, i.e., the driveshaft 24 cannot be under load. This relieves the torque so that there is no stress on the driveshaft 24. Offset angle=(time_bar_1−time_bar_2 )/(time_bar_1−last_time_bar_1). The accuracy of this angle can be increased by using the average of many samples.

To measure cylinder to cylinder variations, the transmission 20 must be in a 1:1 gear ratio. The torque value for each cylinder 12 is repeated every two (2) driveshaft 24 revolutions. The peak value for each cylinder 12 is the value that is preferably used. This value can be identified from the engine timing and fueling of a particular cylinder by finding the peak torque output during that period. When this technique is applied, engine balancing can be accomplished for smoother running.

As discussed above, the method for measuring engine torque includes patterns 50, 52 on the driveshaft 24, measuring the twist of the driveshaft 24, and determining engine torque based on the twist measurement. Preferably, the patterns 50, 52 are formed on the driveshaft between the transmission 20 and axle differential 26. Indices 72 are formed in the patterns 50, 52 to establish baseline references for each pattern 50, 52 so that accurate calibration can be performed.

The twist/torque of the driveshaft 24 is measured multiple times during each revolution of the driveshaft 24 to form a torque profile. The torque profile is read at 120 degree increments for two revolutions to individually assign torque values to each cylinder 12 in a six cylinder engine. The torque profile is read at 90 degree increments for two revolutions to individually assign torque values to each cylinder 12 in an eight cylinder engine.

The subject apparatus provides a simple method for determining engine torque for each cylinder. As a result, adjustments can easily be made to the fuel control system for the engine to provide the desired torque level while accommodating auxiliary loads.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A system for measuring engine torque including:
   an engine having an engine output shaft and a plurality of cylinders actuated by rotation of a crankshaft;
   a driveshaft operably connected to said engine output shaft to provide driving input to an axle differential;
   a sensor assembly having a portion mounted to said driveshaft for optically measuring the twist of said driveshaft; and
   a processor for determining engine torque based on driveshaft twist to control predetermined engine parameters based on the engine torque wherein said processor includes a timing mechanism for timing firing of each of said cylinders such that an individual torque value is assigned to each of said cylinders based on a torque profile generated by optical measurement of driveshaft twist.

2. A system according to claim 1 including a transmission coupled to said engine output shaft and having a transmission output shaft coupled to said driveshaft wherein said sensor assembly is mounted on said driveshaft between said transmission and said axle differential.

3. A system according to claim 2 wherein said sensor assembly includes a position target supported on said driveshaft, at least one laser for generating a beam to scan said target, and at least one photo receiver for receiving a reflected beam from said position target.

4. A system according to claim 3 wherein said position target is comprised of a first specified pattern including reflective and non-reflective surfaces placed on said driveshaft at a first location and a second specified pattern including reflective and non-reflective surfaces placed on said driveshaft, said second specified pattern being spaced apart from said first specified pattern by a predetermined distance.

5. A system according to claim 4 wherein said first and second specified patterns are comprised of a plurality of spaced apart lines having variable thicknesses compared to each other.

6. A system according to claim 5 wherein said driveshaft defines a longitudinal axis and said lines are placed about the circumference of the driveshaft parallel to said longitudinal axis.

7. A system according to claim 4 wherein said at least one laser is comprised of a first laser aimed at said first specified pattern and a second laser aimed at said second specified pattern and wherein said at least photo receiver is a first photo receiver mounted adjacent to said first laser to receive a first reflected beam from said first specified pattern and a second photo receiver mounted adjacent to said second laser to receive a second reflected beam from said second specified pattern.

8. A system according to claim 7 wherein said processor compares data from said first photo receiver to data from said second photo receiver to determine driveshaft twist.

9. A system according to claim 1 wherein said wherein said torque profile includes a plurality of peak torques and wherein said processor matches peak torques to timed cylinder firings to assign said individual torque value to each of said cylinders.

10. A method for measuring engine torque comprising the steps of:
   (a) mounting a position of a sensor assembly on a driveshaft;
   (b) measuring the twist of the driveshaft;
   (c) determining engine torque based on the twist measurement; and
   (d) determining individual cylinder torques for a plurality of cylinders in an engine based on the measurements taken during step (b).

11. A method according to claim 10 wherein step (a) further includes mounting the sensor assembly on the driveshaft between a transmission and drive axle.

12. A method according to claim 11 wherein step (b) further includes optically measuring the twist with at least one laser and photo receiver.

13. A method according to claim 10 wherein step (a) further includes forming a first specified pattern on the driveshaft, forming a second specified pattern on the driveshaft at a predetermined distance from the first specified pattern, scanning the first specified pattern with a first laser, receiving a first reflected beam from the first laser with a first photo sensor, scanning the second specified pattern with a second laser, and receiving a second reflected beam from the second laser with a second photo sensor.

14. A method according to claim 13 including the step of comparing data from the first and second reflected beams to determine driveshaft twist.

15. A method according to claim 14 including the steps of forming a first index in the first specified pattern to establish a first baseline reference, forming a second index in the second specified pattern to establish a second baseline reference, aligning the first index with the second index along the driveshaft, and performing a calibration to account for any offset between the first and second indices.

16. A method according to claim 10 further including the steps of timing firing of each of the cylinders, generating an engine torque profile including a plurality of peak torques based on the measurements taken during step (b), and matching cylinder firing to peak torques to determine each individual cylinder torque.

17. A method according to claim 16 wherein step (b) further includes optically measuring driveshaft twist with at least one optical sensor.

18. A method for measuring engine torque comprising the steps of:
   (a) mounting a portion of a sensor assembly on a driveshaft;
   (b) measuring the twist of the driveshaft multiple times during each revolution of the driveshaft to form a torque profile; and
   (c) determining engine torque based on the twist measurement including reading the torque profile at 120 degree increments for two revolutions to individually assign torque values to each cylinder in a six cylinder engine.

19. A method for measuring engine torque comprising the steps of:
   (a) mounting a portion of a sensor assembly on a driveshaft;
   (b) measuring the twist of the driveshaft multiple times during each revolution of the driveshaft to form a torque profile;
   (c) determining engine torque based on the twist measurement including reading the torque profile at 90 degree increments for two revolutions to individually assign torque values to each cylinder in an eight cylinder engine.

20. A sensor assembly for measuring engine torque including:
   a first pattern formed on a driveshaft;
   a second pattern formed on the driveshaft at a predetermined distance from the first pattern;
   a first laser mounted to a vehicle structure for generating a first beam to scan the first pattern;
   a second laser mounted to the vehicle structure for generating a second beam to scan the second pattern;
   a first photo receiver mounted adjacent to said first laser for receiving a reflected beam from said first pattern;
   a second photo receiver mounted adjacent to said second laser for receiving a reflected beam from said second pattern;
   a processor for comparing data from said first and second photo receivers to determine driveshaft twist and for deriving an engine torque value based on the driveshaft twist; and
   a timing mechanism for timing firing of each of a plurality of engine cylinders wherein said processor compares cylinder firing to a torque profile based on driveshaft twist to determine each individual cylinder torque.

21. An assembly according to claim 20 wherein said first and second patterns are comprised of a plurality of longitudinally extending lines having varying thicknesses compared to each other and being spaced about the circumference of the driveshaft.

22. A method for measuring engine torque comprising the steps of:
   (a) mounting a portion of a sensor assembly on a driveshaft by forming a first specified pattern on the driveshaft and forming a second specified pattern on the driveshaft at a predetermined distance from the first specified pattern;
   (b) measuring the twist of the driveshaft by scanning the first specified pattern with a first laser, receiving a first reflected beam from the first laser with a first photo sensor, scanning the second specified pattern with a second laser, and receiving a second reflected beam from the second laser with a second photo sensor; and
   (c) determining engine torque based on the twist measurement by continuously scanning the first and second specified patterns to generate a torque profile including a plurality of peak torques; timing firing of each of a plurality of cylinders in the engine; and comparing cylinder firing to peak torques in the torque profile to determine each individual cylinder torque in the engine.

* * * * *